US005557179A

United States Patent [19]

Yang

[11] Patent Number: 5,557,179

[45] Date of Patent: Sep. 17, 1996

[54] CONTROL CIRCUIT FOR PLURAL PARTIALLY INTERLOCKED COMMUTATOR TYPE MOTORS WITH OSCILLATION DAMPING CHARACTERISTICS

[76] Inventor: Tai-Her Yang, No. 32 Lane 29, Taipin St., Si-Hu Town, Dzan-Hwa, Taiwan

[21] Appl. No.: 291,682

[22] Filed: Aug. 16, 1994

[51] Int. Cl.⁶ ........ H02N 4/02

[52] U.S. Cl. ........ 318/41; 318/49; 318/52; 318/99

[58] Field of Search ........ 318/99, 100, 41, 318/42, 44, 49, 52, 71; 310/112, 114, 68 R

[56] References Cited

U.S. PATENT DOCUMENTS

| | | | |
|---|---|---|---|
| Re. 19,326 | 9/1934 | Powell | 318/52 |
| 2,182,631 | 12/1939 | Kenyon | 318/52 |
| 4,028,597 | 6/1977 | Delaney et al. | 318/87 |
| 4,500,818 | 2/1985 | Konrad et al. | 318/52 |
| 4,658,189 | 4/1987 | Trusock | 318/52 |
| 5,384,520 | 1/1995 | Yang | 318/79 |

*Primary Examiner*—Brian Sircus
*Attorney, Agent, or Firm*—Bacon & Thomas

[57] ABSTRACT

At least two commutator type motors are arranged to reduce cyclic voltage imbalances or oscillations by connecting a check diode in series with the armature of each motor, and by partially interlocking the motors by connecting the series winding of a neighboring motor to the end of the armature which is not connected to the check diode.

3 Claims, 2 Drawing Sheets

CONTROL CIRCUIT FOR PLURAL PARTIALLY INTERLOCKED COMMUTATOR TYPE MOTORS WITH OSCILLATION DAMPING CHARACTERISTICS

SUMMARY OF THE INVENTION

At least two commutator type motors are arranged to reduce cyclic voltage imbalances by connecting a diode in series with the armature of each motor and by partially interlocking the motors such that at least one series winding of one of the motors is series connected to the armature of the other motor rather than to the armature of its own motor. This partial interlocking can be used with commutated shunt or permanent magnetic motors, although the preferred embodiments are applied to series motors, each having two series windings. The preferred motor is further connected with a voltage balancing line (which may be a voltage balancing resistance combination) at the ends of the respective armatures which are not connected to a choke diode, so as provide damping characteristics for multiple series motors during parallel operations and reduce current oscillations arising from voltage differences caused by different loads, and thereby improve the operating characteristics, and in particular torque distribution characteristics, of the original series or parallel combinations due to different loading conditions or regenerated braking functions.

THE BRIEF DESCRIPTION OF THE DRAWINGS

DETAILED DESCRIPTION OF THE INVENTION

Conventionally, when two commutator type series motors are driven in parallel, balanced operation between the two motors is difficult to obtain, particularly when the ratio between the respective series motor torques and speeds is very large. In contrast, for practical applications when more balanced driving characteristics are required, such as for electrical carrier loads, the invention provides a partially cross interlocked circuit with oscillation damping functions to permit speed differences with a more balanced operating characteristic of the series excited commutator type motors. The preferred circuit is characterized in that the armature windings of the two or more sets of series excited motors, or double excited motors with series excited windings, are series combined with a check diode in the current flow direction, and further series combined with the series winding of the motor itself, which in turn is partially cross interlocked or series combined with the series winding of the neighboring motor and further connected with a voltage balancing line including a voltage balancing resistance connection at the ends of the respective armatures which are not connected to the check diodes. This has the effect of reducing the armature current cycling to improve the operating characteristics of the original series or parallel combinations by improving torque distributions due to different loading conditions or regenerated braking functions.

Figure 1:
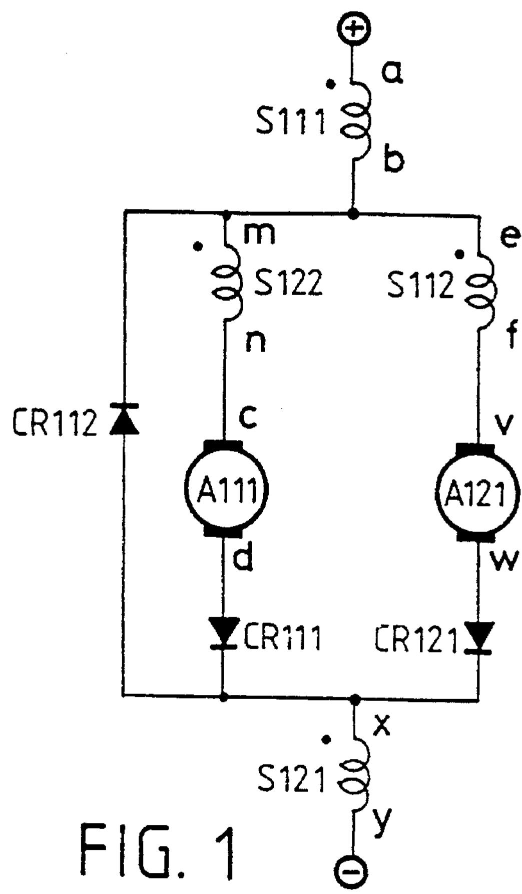
FIG. 1 is a schematic diagram of the basic circuit schematic diagram of a partially interlocked multiple motor control circuit with oscillation damping functions for speed difference permitted commutator type motors.

FIG. 1 is the basic circuit schematic diagram of a preferred partially cross interlocked circuit with unbalanced voltage cyclic current check functions for commutator type motors in which speed differences are permitted. This figure shows, by way of example, two series excited motors, the principal components of which are as follows:

The first motor includes a first series excited winding S111, a second series winding S112, and an armature A111.

The second motor includes a first series winding S121, a second series winding S122, and an armature A121.

The a end of the first series excited winding S111 of the first motor is connected to the positive end of the power source, and the b end of winding S111 is connected to the m end of the second series excited winding S122. The n end of winding S122 is further connected to the c end of the first motor armature A111, and the d end of armature A111 is series combined with the diode CR111 in the current flow direction, the diode CR111 being further connected to the x end of first series excited winding S121 of the second motor and thereby to the negative end of the power source. The w end of the second motor armature A121 is series combined with diode CR121 in the current flow direction, diode CR121 is further connected to the x end of the first series excited winding S121, and the y end of winding S121 is connected to the negative end of the power source. The e end of the second series excited winding S112 of the first motor is also connected to the b end of the first series excited winding S111, while the f end of winding S112 is connected to the v end of the armature A121.

The current values along the respective first series excited windings S111 and S121 of the motors are the same and are the sum of the currents through the second series excited windings S112 and S122 respectively. Diode CR112 is a common flywheel diode which is reversely parallel combined between the "b" and "x" ends of the first series windings. Because the respective first series excited winding S111 and S121 of the two motors share the same current value and the current value is the sum of the two armature current values, when the first motor load is increased, the first motor rotational speed is lowered, as is the counter emf, so that the current of the first motor is increased, and the series excited field winding current of both motors are increased at the same time, causing the second motor rotational speed to also be lowered. Compared to a conventional parallel combination of series excited motors, the preferred circuit furnishes smaller rotational speed differences between motors, resulting in improved stability. Conversely, when the load of the second motor is increased, the first motor will react in the same way as the second motor reacts when the load of the first motor is increased. The current value along the common series excited winding is the added value from the respective series combined motor armatures and is different from that of a conventional series excited motor, while the current values along the second series excited windings are respectively equal to their series combined armature current values, as a result of which the first series excited windings of the motors have a larger current values.

The circuit of FIG. 1, which is the basic circuit of the preferred embodiment, is in summary a circuit in which the respective motors are installed with second series excited windings to have the same current values as that of the respective armatures, such that when the excitation current of one of the second series excited windings is increased due to an increased motor load, the neighboring motor excitation is caused to increase correspondingly.

Figure 2:
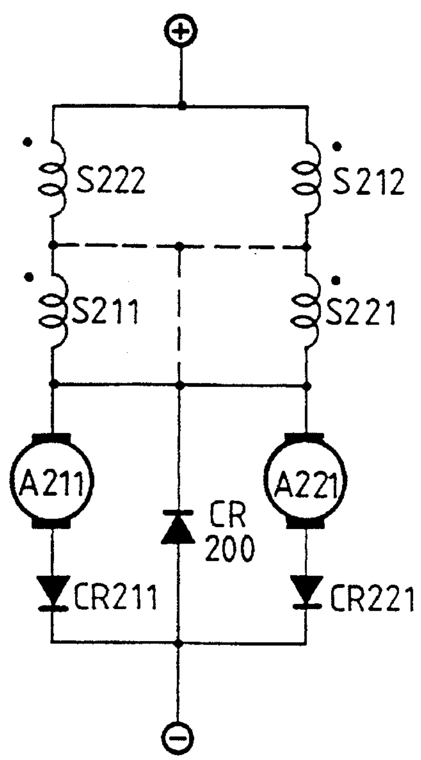
FIG. 2 is a schematic diagram of an example of a parallel combination of partially interlocked series motors according to a preferred embodiment of the invention.

FIG. 2 is a schematic diagram of a variation of the preferred embodiment of FIG. 1, in which:

Two series excited motors which are respectively provided with first series excited windings S211, S221 and second series excited windings S212, S222. The first series excited winding of each motor is series combined with its own armature and is series combined with the second series excited winding of the neighboring motor, and then is mutually parallel combined. To compensate for voltage imbalances, voltage balancing lines may be included between the positive ends of the armatures or, as indicated by dashed lines, between the positive ends of the first series windings, so that the four windings S211, S222, S221, S212 actually form mutually parallel combined series-connected pairs or series connected parallel combinations of windings. More specifically:

The ends of the armatures A211 and A221 are series combined with check diodes CR211, CR221 respectively and then are commonly connected to the negative end of the power source. The other end of the armature A211 is series connected to its own first series excited winding S211, the second series excited winding S222, and the positive end of the power source. The other end of the armature A221 is series connected with its own first series excited winding S221, the second series excited winding S212, and the positive end of the power source. Then a voltage balancing line may be installed between the two ends of the armature A211 and A221 or, as indicated by the dashed line, is installed between the connecting point of the series excited windings S211 and S222, and the connecting point of the series excited windings S221 and S212. As a result, the respective series windings either form pairs of series-connected windings which are mutually parallel combined, or pairs of parallel-connected windings which are mutually series combined. The flywheel diode CR200 is installed between the voltage balancing line and the negative end of the power source to absorb power fluctuations for stable operation. More generally, the motor set can be comprised of two or more motors, in which the first series excited winding of each motor is installed as described above to be series combined with its own armature and then series combined with the second series excited winding of the neighboring motor in sequential order, the last motor armature being series combined with the second series excited winding of the first motor to form a closed ring arrangement of partial cross-connected series combinations. The non-cross connected end of each armature is installed with diodes in the current flow direction and is parallel connected to the negative end of the power source as described above.

Figure 3:
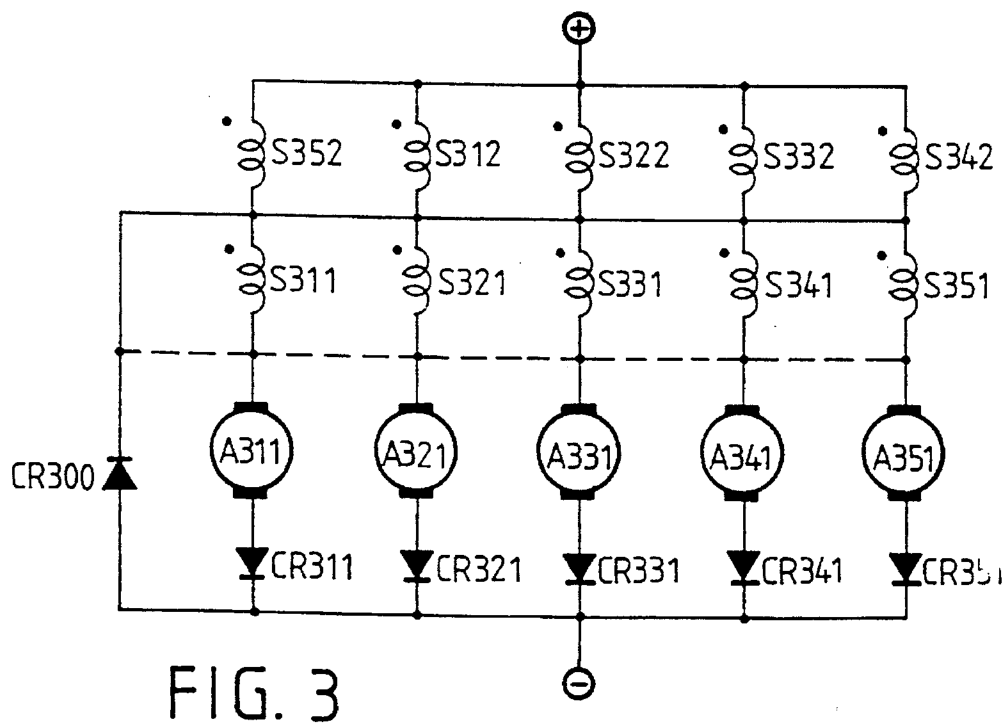
FIG. 3 illustrates an application of the circuit of FIG. 2 to more than two motors.

FIG. 3 depicts an example of the circuit of FIG. 1 involving five motors having armatures A311–A351 respectively, each of which is respectively series combined with the check diodes CR311–CR351, the output end of each check diode being commonly connected to the negative end of the power source. The "first" series excited windings of this arrangement are S311–S351 respectively, the "second" series excited windings are S312–S352 respectively. CR300 represents the flywheel diode.

Figure 4:
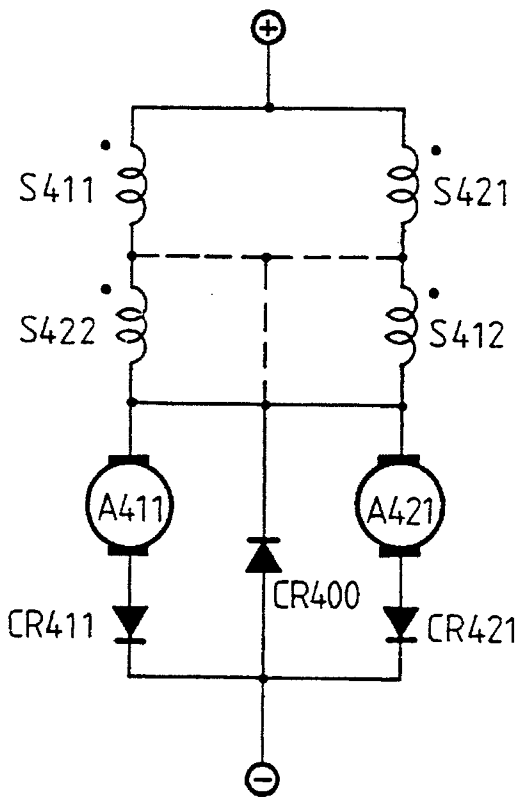
FIG. 4 illustrates a variation of the embodiment of FIG. 2 wherein the sequential orders of the respective series excited windings are exchanged.

Alternatively, the sequential orders of the respective motor armature series-connected series windings of FIG. 2 can be exchanged, i.e., the motor armatures may first be series combined with the second series excited winding of the neighboring motor and, then connected with the first series excited winding of the motor itself. FIG. 4 illustrates an example of the circuit of FIG. 2 in which the sequential orders of the respective series excited windings are exchanged, the circuit being comprised of the following elements:

The ends of the respective armatures A411 and A421 are respectively series combined with the check diodes CR411 and CR421, which are mutually connected to the negative end of the power source. The other end of the armature A411 is series connected to the second series excited winding S422 of the neighboring motor, and then is further series connected with the first series excited winding S411 to the positive end of the power source. The other end of the armature A421 is series connected with the second series excited winding S412 of the neighboring motor, and is further series connected with its own first series excited winding S421 to the positive end of the power source.

One voltage balancing line can be connected to either end of the armatures A411 and A421, or can be connected (as shown in dashed lines) between the connecting point of the series excited windings S411 and S422 and the connecting point of the S412 and S421 to form pairs of windings in a manner similar to the arrangement of FIG. 2, described above.

One flywheel diode CR400 is parallel combined between the voltage balancing line and the negative end of the power source.

More generally, the motor set of the embodiment of FIG. 4 can be comprised of two or more motors, wherein one end of each armature is installed with diodes in the current flow direction and is commonly connected at the negative end of the power source. The other end of each armature is series combined with the second series excited winding of the neighboring motor and is further series combined in sequential order with the first series excited winding of the motor itself. The first motor armature is series combined with the second series excited winding of the last motor and is further series combined with first series excited winding of the first motor itself, to thereby form a closed loop type arrangement of partially-cross linked series combinations to provide mutual interactions.

Figure 5:
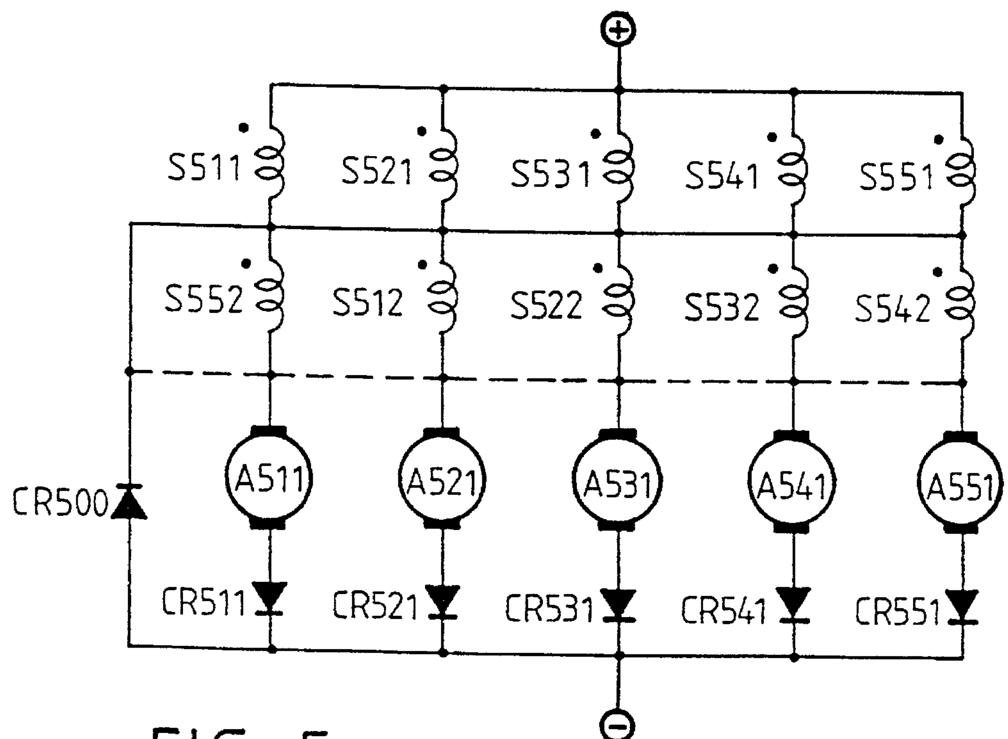
FIG. 5 illustrates an application of the circuit of FIG. 4 to more than two motors.

FIG. 5 depicts an example of five motors, wherein the armatures are A511–A551 respectively, each of which is series combined with check diodes CR511–CR551 respectively, and the output ends of the check diodes are commonly connected to the negative end of the power source. The first series excited windings of the motors are respectively S511–S551, the second series excited windings are respectively S512–S552, and diode CR500 is the flywheel diode.

The aforesaid embodying examples 1–5 can further utilize switches controlled through the second series excited windings between the neighboring motors and their mutual relationships to provide regenerated braking functions, and by switching the ratio of the excitation ampere turns between the motor armature series-combined first series excited windings and the second series excited windings to modulate the braking power ratio of the regenerated braking functions. In practical applications, the partially interlocked circuit with oscillation damping can take a number of forms:

(1) Mechanical variations: The motors may be made up of two or more independent commutator type motors connected together or enclosed with a common housing structure.

(2) Electrical variations: The motors can include series excited motors or compound motors or compound motors with series excited windings, wherein for the case of compound motors, the shunt excited field winding can use the common long double excitation configuration, or a short double excitation configuration, with or without, auxiliary excitation or differential excitations.

(3) Electric control variations: The motors can be made up of commutator type motors driven by a speed difference permitted parallel operating circuit, or can be switched between the impedances of the series or parallel combinations.

I claim:

1. A partially interlocked motor control circuit for plural commutator type motors, comprising:

first and second armatures each having first and second ends;

a first diode connected to the first end of the first armature and a second diode connected to the first end of the second armature; and a first series field winding arranged to magnetically interact with the first armature to cause the first armature to rotate when a current is present in the first series field winding and a second series field winding arranged to magnetically interact with the second armature to cause the second armature to rotate when a current is present in the second series field winding, wherein the first series field winding is series connected to the second end of the second armature and wherein the second series field winding is series connected to the second end of the first armature, and further comprising a third series field winding arranged to magnetically interact with the first armature and connected between a terminal of the power supply and each of the first and second series field windings, and a fourth series field winding arranged to magnetically interact with the second armature and connected between a second terminal of the power supply and each of said diodes.

2. A partially interlocked motor control circuit as claimed in claim 1, further comprising a flywheel diode connected between said third and fourth series field windings.

3. A partially interlocked motor control circuit for plural commutator type motors, comprising:

a plurality of motors including at least a first motor having a first armature, at least one next motor having a corresponding at least one second armature, and a last motor having a third armature, said first, second, and third armatures each having first and second ends;

a first diode connected to the first end of the first armature, at least one second diode connected to the first end of a corresponding second armature, and a third diode connected to the first end of the third armature; and first and second series field windings arranged to magnetically interact with the first armature to cause the first armature to rotate when a current is present in the first and second series field windings, third and fourth series field windings arranged to magnetically interact with a corresponding at least one second armature to cause the second armature to rotate when a current is present in the third and fourth series field windings, and fifth and sixth series field winding arranged to magnetically interact with the third armature to cause the third armature to rotate when a current is present in the third series field winding, wherein a first end of the first series field winding is connected to a second end of the fourth series field winding and the first and fourth series field windings are connected between a terminal of the power supply and the first armature, wherein a first end of the third series field winding is connected to a second end of a sixth series field winding corresponding to a first of the at least one next motors and the third and sixth series field windings are connected between the power supply terminal and a second armature corresponding to the first of the at least one next motors, wherein a first end of the fifth series field winding is connected to a second end of the second series field winding and the fifth and second series field windings are connected between the power supply terminal and the third armature.

* * * * *